United States Patent
Chin et al.

(10) Patent No.: US 10,698,927 B1
(45) Date of Patent: Jun. 30, 2020

(54) MULTIPLE SENSOR SESSION AND LOG INFORMATION COMPRESSION AND CORRELATION SYSTEM

(71) Applicant: PALANTIR TECHNOLOGIES INC., Palo Alto, CA (US)

(72) Inventors: Daniel Chin, Mountain View, CA (US); Daniel Dries, San Jose, CA (US)

(73) Assignee: Palantir Technologies Inc., Palo Alto, CA (US)

(*) Notice: Subject to any disclaimer, the term of this patent is extended or adjusted under 35 U.S.C. 154(b) by 263 days.

(21) Appl. No.: 15/672,069

(22) Filed: Aug. 8, 2017

Related U.S. Application Data

(60) Provisional application No. 62/381,277, filed on Aug. 30, 2016.

(51) Int. Cl.
*G06F 16/28* (2019.01)
*G06F 7/08* (2006.01)
(Continued)

(52) U.S. Cl.
CPC .............. *G06F 16/285* (2019.01); *G06F 7/08* (2013.01); *G06F 9/547* (2013.01);
(Continued)

(58) Field of Classification Search
CPC ............ G06Q 30/0267; G06Q 30/0269; G06F 16/245; G06F 16/285; G06F 21/577; G06F 16/00; G06F 17/218; G06F 17/2705
(Continued)

(56) References Cited

U.S. PATENT DOCUMENTS

| | | |
|---|---|---|
| 5,978,475 A | 11/1999 | Schneier et al. |
| 6,253,203 B1 | 6/2001 | O'Flaherty et al. |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Angelica Ruiz
(74) *Attorney, Agent, or Firm* — Knobbe, Martens, Olson & Bear, LLP

(57) ABSTRACT

Methods, systems and apparatus, including computer programs encoded on computer storage media for compressing sensor log information. One of the methods includes accessing log information maintained in one or more databases, the log information being generated in response to actions associated with entities, and the log information indicative of respective sessions for which one or more logs were generated, each log indicating an entity. Log information is grouped according to entity. One or more logs associated with respective sessions based on the grouped log information. Compressed logs are generated from logs associated with respective sessions based on compression rules.

20 Claims, 4 Drawing Sheets

(51) Int. Cl.
*G06F 9/54* (2006.01)
*G06F 16/174* (2019.01)
*G06F 16/22* (2019.01)
*G06F 16/23* (2019.01)

(52) U.S. Cl.
CPC ...... *G06F 16/1744* (2019.01); *G06F 16/2282* (2019.01); *G06F 16/2322* (2019.01); *G06F 16/2358* (2019.01); *G06F 16/2365* (2019.01)

(58) Field of Classification Search
USPC .......................................... 707/600–831, 899
See application file for complete search history.

(56) References Cited

U.S. PATENT DOCUMENTS

| | | | |
|---|---|---|---|
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,596,285 B2 | 9/2009 | Brown et al. | |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,335,897 B2 | 5/2016 | Goldenberg | |
| 9,338,013 B2 | 5/2016 | Castellucci et al. | |
| 2002/0112157 A1 | 8/2002 | Doyle et al. | |
| 2004/0123139 A1 | 6/2004 | Aiello et al. | |
| 2004/0153418 A1 | 8/2004 | Hanweck | |
| 2004/0250124 A1 | 12/2004 | Chesla et al. | |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0179003 A1 | 8/2006 | Steele et al. | |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0143851 A1 | 6/2007 | Nicodemus | |
| 2007/0219991 A1* | 9/2007 | Guthrie ................. G06F 19/324 | |
| 2007/0294766 A1 | 12/2007 | Mir et al. | |
| 2008/0104407 A1 | 5/2008 | Horne et al. | |
| 2008/0154928 A1* | 6/2008 | Bashyam ................ H03M 7/30 | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0228701 A1 | 9/2009 | Lin | |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0179831 A1 | 7/2010 | Brown et al. | |
| 2010/0235915 A1* | 9/2010 | Memon ................ H04L 63/145 726/23 | |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0093339 A1* | 4/2011 | Morton ................. G06Q 30/02 705/14.58 | |
| 2011/0202555 A1 | 8/2011 | Cordover et al. | |
| 2011/0212717 A1* | 9/2011 | Rhoads .............. G06K 9/00664 455/420 | |
| 2011/0219450 A1 | 9/2011 | McDougal et al. | |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0120441 A1* | 5/2012 | Kaneko ................ H04L 41/069 358/1.15 | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0110876 A1 | 5/2013 | Meijer et al. | |
| 2013/0139268 A1 | 5/2013 | An et al. | |
| 2013/0239217 A1 | 9/2013 | Kindler et al. | |
| 2014/0013334 A1* | 1/2014 | Bisdikian ............ G06F 11/0709 719/313 | |
| 2014/0013451 A1 | 1/2014 | Kulka et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0283107 A1 | 9/2014 | Walton et al. | |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castelluci et al. | |
| 2015/0229664 A1 | 8/2015 | Hawthorn et al. | |
| 2015/0244820 A1* | 8/2015 | Verkasalo ............ G06F 16/958 707/740 | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

(56) References Cited

OTHER PUBLICATIONS

Ma et al., "A New Approach to Secure Logging," ACM Transactions on Storage, vol. 5, No. 1, Article 2, Published Mar. 2009, 21 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
VirusTotal—About, <http://www.virustotal.com/en/about/> Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis," Nucleic acids research 36.suppl 2 (2008): pp. W385-W363.

\* cited by examiner

MULTIPLE SENSOR SESSION AND LOG INFORMATION COMPRESSION AND CORRELATION SYSTEM

CROSS-REFERENCE TO RELATED APPLICATIONS

This application claims priority to U.S. Prov. Patent Appl. No. 62/381,277 titled "MULTIPLE SENSOR SESSION AND LOG INFORMATION COMPRESSION AND CORRELATION SYSTEM" and filed Aug. 30, 2016, which is hereby incorporated by reference in its entirety.

Any and all applications for which a foreign or domestic priority claim is identified in the Application Data Sheet as filed with the present application are hereby incorporated by reference in their entirety under 37 CFR 1.57.

BACKGROUND

Logs can be generated and maintained by a plethora of systems, devices, and so on, in response to actions such as sensor events, web analytics, VPN access events, geospatial movement, payment processing events, security monitoring, and so on. The logs can be stored as rows of a table (e.g., a database table), with each row specifying information organized into particular columns of the table. A reviewing user attempting to understand the table, with logs associated with the systems, devices, and so on, spread throughout the table, can be hindered by logs associated with each system, device, not being grouped together, and by the logs specifying extraneous information that can be difficult to understand (e.g., understand an overall context) when spread throughout the table.

SUMMARY

Particular embodiments of the subject matter described in this specification can be implemented so as to realize one or more of the following advantages. Log information can be obtained from different systems, sensors, and so on, and compressed (e.g., information specified in multiple logs can be compressed and/or coalesced into a single log) while preserving useful information specified in the logs (e.g., 98%, 99%, 99.99%, 100%, of the information included in logs can be included in compressed logs, while preserving storage space). In this way, the information can be coalesced while reducing consumption of storage space. Furthermore, users examining the compressed logs can more easily understand a context in which the logs were generated.

In general, one innovative aspect of the subject matter described in this specification can be embodied in systems, computer readable media, and methods that include the actions of accessing log information maintained in one or more databases, the log information being generated in response to actions associated with entities, the log information including, at least, information indicative of respective sessions for which one or more logs were generated, each log indicating an entity; grouping log information according to entity; determining, for respective entities based on the grouped log information, one or more logs associated with respective sessions; and generating, from logs associated with each session, a compressed log based on one or more compression rules.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the one or more of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with one or more specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
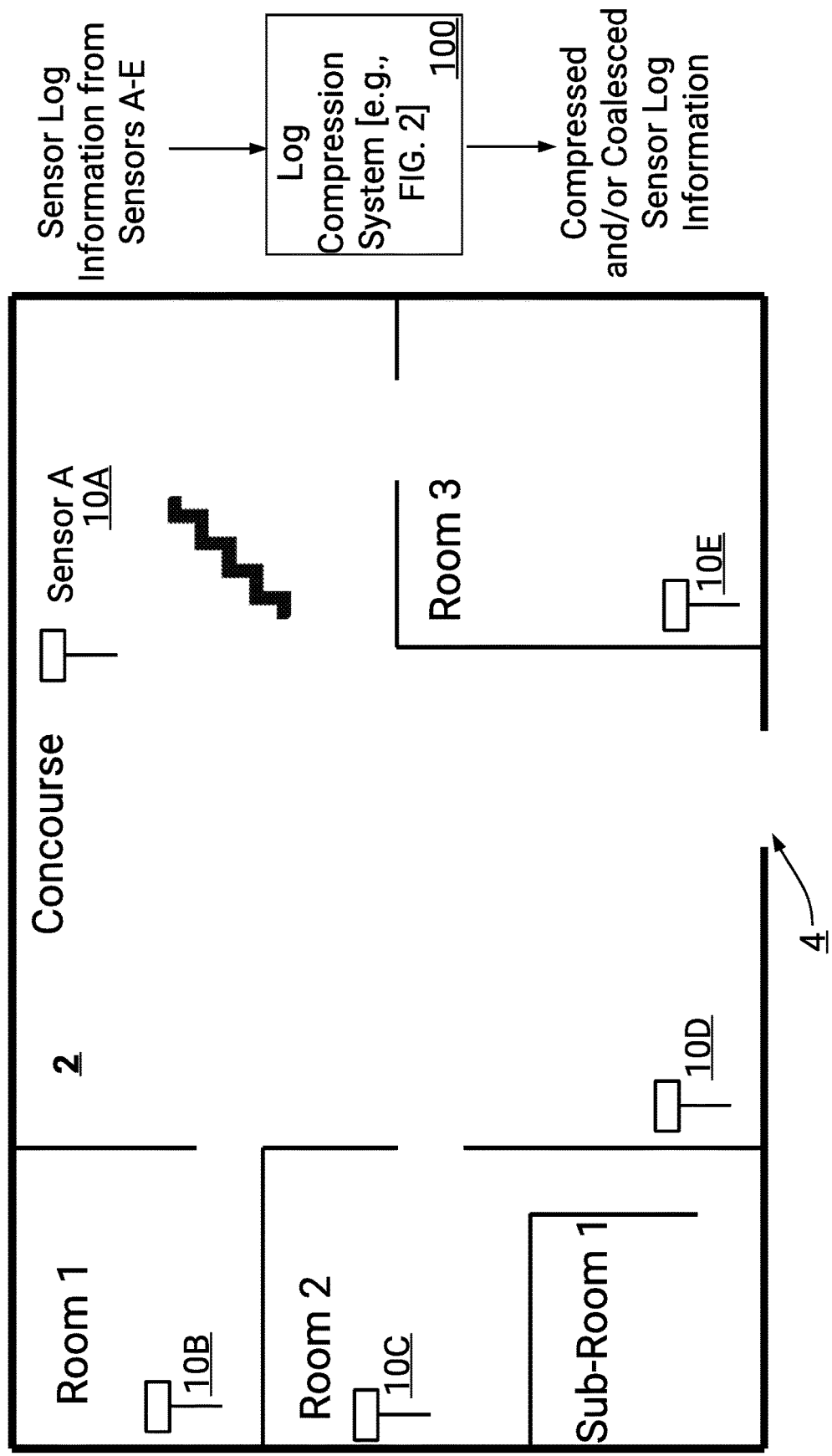
FIG. 1 illustrates a block diagram of example sensors included in an example area.

This specification describes a system (e.g., the log compression system 100 described below) that can access arbitrary log information associated with entities (e.g., systems, devices, machines, vehicles, probes, sensors, users, user accounts), and can compress and/or coalesce the log information while preserving information (e.g., useful information, such as information determined, or specified by a user, as being useful or otherwise worth preserving) included in the log information. For instance, the log information can initially be spread through one or more tables (e.g., within multiple rows in one or more database tables), and the system can compress and/or coalesce information included within the multiple rows associated with a same entity into a single row that may be more efficiently stored or displayed for end user consumption. While reference is made herein to compressing information, it should optionally be understood that the information is being coalesced. That is, the information included within the multiple rows described above can be coalesced into a single row, such that particular, or all of the, information is preserved.

As an example, a multitude of sensors can be utilized to detect events in a computer network. The sensors can monitor the computer network, such as login activity with respect to resources (e.g., computer systems) of the computer network, network traffic, disk utilization of resources, email activity, and so on. One or more sensors may additionally be utilized to monitor states of physical conditions with respect to the computer network, for example temperature (e.g., temperatures of resources, air temperatures), pressure (e.g., pressure associated with cooling pumps), and so on. Information can be generated in response to sensors detecting events, processes, and so on, and stored in one or more tables. The log compression system 100 can access the tables and compress and/or coalesce information included in the tables as described herein.

As another example, a multitude of sensors can be spread around a particular area, such as a museum, mine, house, or office, and can monitor physical events, processes, phenomena, and so on. For example, the sensors can detect sounds (e.g., the sensors can measure sound volumes, identify speech or particular audio, and so on), determine, at least in part, presence of particular humans or unknown humans (e.g., the sensors can obtain and analyze video or images of the particular area), atmospheric conditions (e.g., the sensors can measure air quality, measure particulate matter such as associated with particulars chemicals or the presence of fire), and so on. As the sensors monitor physical events, processes, and so on, logs can be generated (e.g., by a system in communication with the sensors, or by the sensors and provided to the system in communication with the sensors). For example, an audio sensor can detect a sudden sound greater than a threshold volume, and one or more logs can be generated that (1) identify the sensor, (2) specify time stamps associated with the detection, and (3) include information indicative of the context for which the logs were generated (e.g., the sudden sound). As will be described, the one or more logs can be part of a same session that is associated with the context. In this example, a particular row of a table (e.g., database table) can include (e.g., in columns of the particular row) the identification of the sensor, the specified time stamp, and the information indicative of the context. In accordance with one or more embodiments, a context may include any descriptive identifier, term, phrase, and so on, that describes, or is indicative of, a reason for which one or more logs were generated. In addition, a context may also include a sensor type (e.g., temperature, pressure, etc.) or be associated with a category of action flows or event flows.

In the case of a sound sensor (e.g., microphone), as the sensor monitors a sudden sound, additional logs can be generated that are associated with the context. For example, additional rows of a table can include the identification of the sensor, respective time stamps, and particular actions or events related to the context (e.g., increases or decreases in volume, an end to the sound, frequency analysis, and so on.) Additional example actions can include, an object's movement through a video frame, a computer network user's movement through the network, and so on as will be described in more detail below. Therefore, multiple rows of the table can be associated with the same context (e.g., detection of the sudden sound). As will be described, these multiple rows, which are herein referred to as being part of a same session (e.g., sensing session), can be compressed and/or coalesced into a single row, such that information specified in the multiple rows can be compressed and/or coalesced into a simpler single row.

Each session (e.g., sensing session) can initiate at a row and optionally include additional rows over a period of time. While the period of time can be finite, it can be unknown in advance, such that different sessions can include varying number of logs. Therefore, as other sensors trigger generation of logs (e.g., at a same, or similar time), and over lengthy and potentially unknown durations of time, the resulting multi-row table may include a large amount of rows specifying information from different sensors that are shuffled/interleaved with all other sensors. Therefore, the table may have no clear link between the rows and perhaps no obvious beginning and end to any particular sensing session, making any downstream consumption and interpretation (e.g., by human analysts or by machine) of the table impossible without use of the described system. In the example of the audio sensor above, the multiple rows associated with the detection of the sudden sound may be spread throughout the table, with each successive row associated with the detection (e.g., actions or events associated with the detection as described above) separated by hundreds, thousands, and so on, rows associated with other sensors that generate, or cause generation of, logs in the interim between the actions associated with the detected sound. Additionally, there may be no guarantee that logs are stored according to timestamp, and logs may therefore be randomly spread throughout the table.

Therefore, and as will be described, the system can separate out each sensor's data stream and determine a session length for each session, such that each session's included logs can be compressed and/or coalesced into a single log. In this way, the system can generate a succinct view of the session. Since downstream consumption may be time-sensitive, real-time analyzing of unprocessed log information can therefore be infeasible, and the techniques described herein can enable the feasibility of the consumption. As an example, a machine-based user utilizing an application programing interface (API) may access the compressed and/or coalesced log information in order to quickly determine whether to initiate a physical real-world action (e.g., corrective action). For instance, the machine-based user may cause the locking down of a room, the denying of access to a resource on a network, altering a physical machine, changing local conditions associated with a chemical process, and so on.

In the example of the audio sensor above, the multiple rows associated with the initial detection of the sudden sound may be compressed and/or coalesced into a single row. The system can determine this session from multiple interleaved streams from multiple sensors, and determine compressed and/or coalesced single row sessions from the disorder. That is, the system can determine that the multiple rows are associated with the same sensor that makes a measurement in a particular context (e.g., the initial detection of the sudden sound), and even though the individual rows may not contain each context information, the system can compress and/or coalesce the rows such that a single row can be generated that summarizes log information associated with the context and/or entity.

To compress and/or coalesce information, the system can apply one or more compression rules to logs included in a same session. A compression rule can indicate, for example, that information included in a particular column of the database tables is to be (1) combined (e.g., concatenated) when multiple rows are being compressed and/or coalesced, (2) discarded when multiple rows are being compressed and/or coalesced, or (3) selected for a particular row, and discarded for other rows, when multiple rows are being compressed and/or coalesced. In this way, information associated with a session, such as particular actions, events, and so on, can be located in large database tables, and compressed and/or coalesced into easy to understand singular rows of a database table. Examples of logs and compressing log information are included below, with respect to FIG. 1.

While the above description includes reference to sensors detecting and/or monitoring events, processes, and so on, the methods and systems described herein can be applied to other entities and log information. For example, log information can include user account login data, and particular contexts associated with user accounts can be detected, such as a user account responding to a provided login screen, the user account being initially created, the user account being authorized, and so on, in which case the sensor may include a software widget embedded within a website. Each of the particular contexts can be associated with actions or events, and thus the context data may include a description of the category of action taken by the user (e.g., context data that may be strings that indicate "login", "account creation", "account_recovery", and so on). Additionally, log information can be organized in any arbitrary data format (e.g., XML, JSON, YAML) and stored in, for instance, one or more database tables or other storage schemes. In other examples, the raw data from the sensors may be formatted and/or structured according to various streaming algorithms and/or protocols and/or various wireless or cellular communication protocols.

FIG. 1 illustrates a block diagram of example sensors 10A-10E included in an example area 2. As illustrated in the example, the area 2 is a building (e.g., a floorplan as illustrated), which includes multiple rooms, and the sensors 10A-10E are placed in the rooms. As described above, the sensors can monitor video or images (e.g., thermal, ultraviolet, visual, images), audio, air quality, presence of WiFi or cell signals being transmitted, and so on. As an example, sensor 10D can monitor a doorway 4 (e.g., as illustrated in the floorplan of the area 2) for changes in audio, video, and so on, associated with the doorway 4. For instance, a person may enter the Concourse via the doorway 4, and the sensor 10D can trigger an alert associated with the entry, which can be generated as one or more logs included in log information (e.g., respective log entries, which can be stored as respective rows of a database table). As will be illustrated, each log can specify (1) the sensor 10D, (2) a timestamp associated with each log, and (3) information indicative of a context/action associated with the trigger.

An example of log information associated with sensor 10D being triggered is illustrated below. The log information represents a particular sensing stream describing detected movement and/or behavior of persons being monitored. The Contexts/Actions may be extracted from video data, triggered via proximity sensors, and so on, and may be logged in each row of the log information. Timestamps are further included to indicate a time at which the sensor sensed the particular Context/Action being logged.

| Session ID | Context | Action | Entity Identifier | Timestamp |
|---|---|---|---|---|
| 12345 | Physical Entry Detection | | Sensor 10D | 2016 Jan. 01 12:00:00 |
| | | Movement in View | Sensor 10D | 2016 Jan. 01 12:00:01 |
| | | Movement out of View | Sensor 10D | 2016 Jan. 01 12:00:13 |

The example log information, which as an example can be included in a database table with rows being respective logs (e.g., log entries), includes columns describing example information specified by the logs. For instance, the Session ID can be a unique identifier associated with the initial generation of logs associated with a new, changed, or updated, sensing session. In the example above, the Session ID is a value that specifies a start of a new sensing session, and as described above, one or more rows can be associated with the new sensing session. The Session ID can be specified a single time for a new, changed, or updated, sensing session (e.g., as illustrated), or in each row associated with a same sensing session (e.g., optionally the Session ID can be specified in the latter two rows). The context column includes an identifier, description, text, and so on, that is associated with the sensing session (e.g., a property of the sensing session), which in this case is "Physical Entry Detection," indicating that a sensor (e.g., Sensor 10D) detected physical entry.

The action column specifies particular descriptors of a context associated with a sensing session, for example the actual actions being logged as a person attempts to enter a building. In the example above, the actions associated with the context can include movement being in view of the sensor 10D and movement changing to be out of view of the sensor 10D. Additional actions may include Identity Captured, Identity Validated, Entry Approved, Identity Unknown, Entry Denied, and so on. For example, the Action column can be utilized by a system to log various steps of validating an identity of a person seeking access. Each row specifies a timestamp associated with the log, which can be used for example to enable a reviewing user (e.g., security personnel) to obtain video or images from the sensor 10D at the timestamps. The column timestamps can be determined by (1) the sensor 10D or (2) a system that receives information from the sensor 10D. The column entity identifier specifies a unique identifier associated with an entity, which in this example is "Sensor 10D."

While the above log information includes particular columns, other columns (e.g., labels), contexts, actions, and so on, can be utilized as will be described further with respect to FIG. 3. As a simple example, log information can be associated with a system (e.g., server system) that enables consumers to purchase goods. An example session included in the log information can describe a consumer checking out, for example on a web page, and paying for a good. The session can be specified in the log information as initiating at a row identifying a context of "checkout policy," for instance a policy implemented by the system when consumers perform a checkout process, and actions associated with the context can include "receive payment information" (e.g., systems received user entered credit card data, user provided credentials associated with online payment solution), "process payment information" (e.g., system processes payment information), and "checkout passed" (e.g., system determines that payment information was successfully validated and processed).

As the sensors 10A-10E generate, or trigger generation of, log information, the logs may be included in a table and no clear link between any of the logs may be evident. For instance, a portion of an example table can include:

| Session ID | Context | Action | Entity Identifier | Timestamp |
|---|---|---|---|---|
| 12345 | Physical Entry Detection | | Sensor 10D | 2016 Jan. 01 12:00:00 |
| 8937234 | Window Open | | Sensor 10C | 2016 Jan. 01 12:00:02 |
| | Heat Detected | | Sensor 10E | 2016 Jan. 02 02:03:45 |
| | | Window Sound Detected | Sensor 10C | 2016 Jan. 01 12:01:32 |
| | | Talking Detected | Sensor 10C | 2016 Jan. 01 12:01:59 |
| 098234 | Physical Entry Detection | | Sensor 10A | 2016 Jan. 01 03:06:23 |
| | | Movement In View | Sensor 10D | 2016 Jan. 01 12:00:05 |
| | | Measured Heat Greater than Threshold | Sensor 10E | 2016-01-02 02:03:46 |
| | | Movement Out Of View | Sensor 10D | 2016 Jan. 01 12:00:13 |
| 18094302 | Window Closed | | Sensor 10C | 2016 Jan. 01 12:02:15 |
| | | Window Sound Detected | Sensor 10C | 2016 Jan. 01 12:02:15 |

As illustrated in the example portion, the log information can include logs not ordered according to timestamp, logs not ordered according to entity identifier, and logs not ordered such that a row indicating a context is followed by rows specifying actions associated with the context. For instance, Session ID: 12345 specifies a context of "Physical Entry Detection" by Sensor 10D, however the actions associated with the context are not included until the end of the portion.

Thus, as will be described further in FIG. 3, the system (e.g., log compression system 100) can obtain log information and (1) group the log information according to entity identifier, (2) order the grouped log information according to time (e.g., all log entries associated with an entity are sorted according to timestamp), (3) identify logs associated with a same sensing session, (4) compress and/or coalesce logs associated with the same sensing session into a single row.

An example of ordered grouped log information according to time, and context, is as follows:

| Session ID | Context | Action | Entity Identifier | Timestamp |
|---|---|---|---|---|
| 098234 | Physical Entry Detection | | Sensor 10A | 2016 Jan. 01 03:06:23 |
| 12345 | Physical Entry Detection | | Sensor 10D | 2016 Jan. 01 12:00:00 |
| | | Movement In View | Sensor 10D | 2016 Jan. 01 12:00:05 |
| | | Movement Out Of View | Sensor 10D | 2016 Jan. 01 12:00:13 |
| 8937234 | Window Open | | Sensor 10C | 2016 Jan. 01 12:00:02 |
| | | Window Sound Detected | Sensor 10C | 2016 Jan. 01 12:01:32 |
| | | Talking Detected | Sensor 10C | 2016 Jan. 01 12:01:59 |

-continued

| Session ID | Context | Action | Entity Identifier | Timestamp |
|---|---|---|---|---|
| 18094302 | Window Closed | | Sensor 10C | 2016 Jan. 01 12:02:15 |
| | | Window Sound Detected | Sensor 10C | 2016 Jan. 01 12:02:15 |
| | Heat Detected | | Sensor 10E | 2016 Jan. 02 02:03:45 |
| | | Measured Heat Greater than Threshold | Sensor 10E | 2016 Jan. 02 02:03:45 |

As described above, the system (e.g., log compression system 100) can identify all logs associated with each entity (e.g., sensors 10A-10E), and order the logs associated with each entity according to time. After ordering the logs according to time, the system identifies all logs that are associated with a same sensing session.

As an example of determining a sensing session, after the logs are ordered by time, the system can scan each row and identify a first non-empty value for "Session ID," and then select all successive rows as being part of the sensing session if (1) the Session ID is empty and/or the same and (2) the entity identifier is the same. If either the Session ID is not empty or the entity identifier is different, then a new sensing session can be identified, that is an initial row of the new sensing session can be identified. For example using Sensor 10C, a first non-empty value of Session ID is identified (e.g., "8937234"), and subsequent rows that specify Sensor 10C and that have empty values of Session ID are grouped together. When the next non-empty value of Session ID is identified for Sensor 10C (e.g., "18094302"), the rows associated with the next Session ID are grouped similarly as a part of a sensing session.

In some cases the log information may be faulty or partially corrupted, and thus not include information as expected. For example, the row specifying Sensor 10E "Heat Detected" at timestamp 2016-01-02 02:03:45 does not specify a Session ID (e.g., the Session ID may be corrupted, or never sent or recorded), yet a new sensing session is evident from the log information. In accordance with the above example of determining a sensing session, as the system scans from the row with timestamp 2016-01-01 12:02:15 to the row with timestamp 2016-01-02 02:03:45, a change in entity occurs. For example, the entity changes from "Sensor 10C" to "Sensor 10E". In this example, the system can determine that a new sensing session has indeed begun because the entity identifier has changed in the log information.

After selecting all rows that have the same entity identifier and a NULL session identifier as illustrated above (e.g., rows part of a same sensing session), the system can compress and/or coalesce the log information according to one or more compression rules. As described above, a compression rule can indicate, for instance, that information included in a particular cell within a column is to be (1) combined when multiple rows are being compressed, (2) discarded when multiple rows are being compressed, or (3) selected for a particular row, and discarded for other rows, when multiple rows are being compressed.

In the following example log information, example compression rules are utilized. An example compression rule can include, for the Session ID, Entity Identifier, and Timestamp columns, selecting the latest (e.g., in time) non-empty value from rows associated with a same sensing session. Another example compression rule can include, for the Context column, selecting the first non-empty value from the rows. Another example compression rule can include, for the Action column, combining all values (e.g., concatenate the values) from the rows. For example:

| Session ID | Context | Action | Entity Identifier | Timestamp |
|---|---|---|---|---|
| 098234 | Physical Entry Detection | | Sensor 10A | 2016 Jan. 01 03:06:23 |
| 12345 | Physical Entry Detection | Movement In View; Movement Out Of View | Sensor 10D | 2016 Jan. 01 12:00:13 |
| 8937234 | Window Open | Window Sound Detected; Talking Detected | Sensor 10C | 2016 Jan. 01 12:01:59 |
| 18094302 | Window Closed | Window Sound Detected | Sensor 10C | 2016 Jan. 01 12:02:15 |
| | Heat Detected | Measured Heat Greater than Threshold | Sensor 10E | 2016 Jan. 02 02:03:45 |

As illustrated above, log information associated with a same sensing session can be compressed and/or coalesced, while preserving information specified in the log information. Different compression rules can be utilized, and can be user selectable or definable, such that for arbitrary log information the log information can be similarly compressed. As an example, a different compression rule for the Timestamp column can be utilized. For example, the compression rule can specify that a range of Timestamps is to be specified when compressing rows associated with a same session (e.g., for the row with Session ID "12345", the Timestamp value can indicate that the Timestamps extended from 2016-01-01 12:00:00 to 2016-01-01 12:00:13).

In this way, complex log information can be analyzed, and compressed and/or coalesced, such that a downstream data consumer can more readily interpret the data. For example, a human user can quickly glance at the log information and understand important events, actions, and so on, that are described in the log information.

Figure 2:
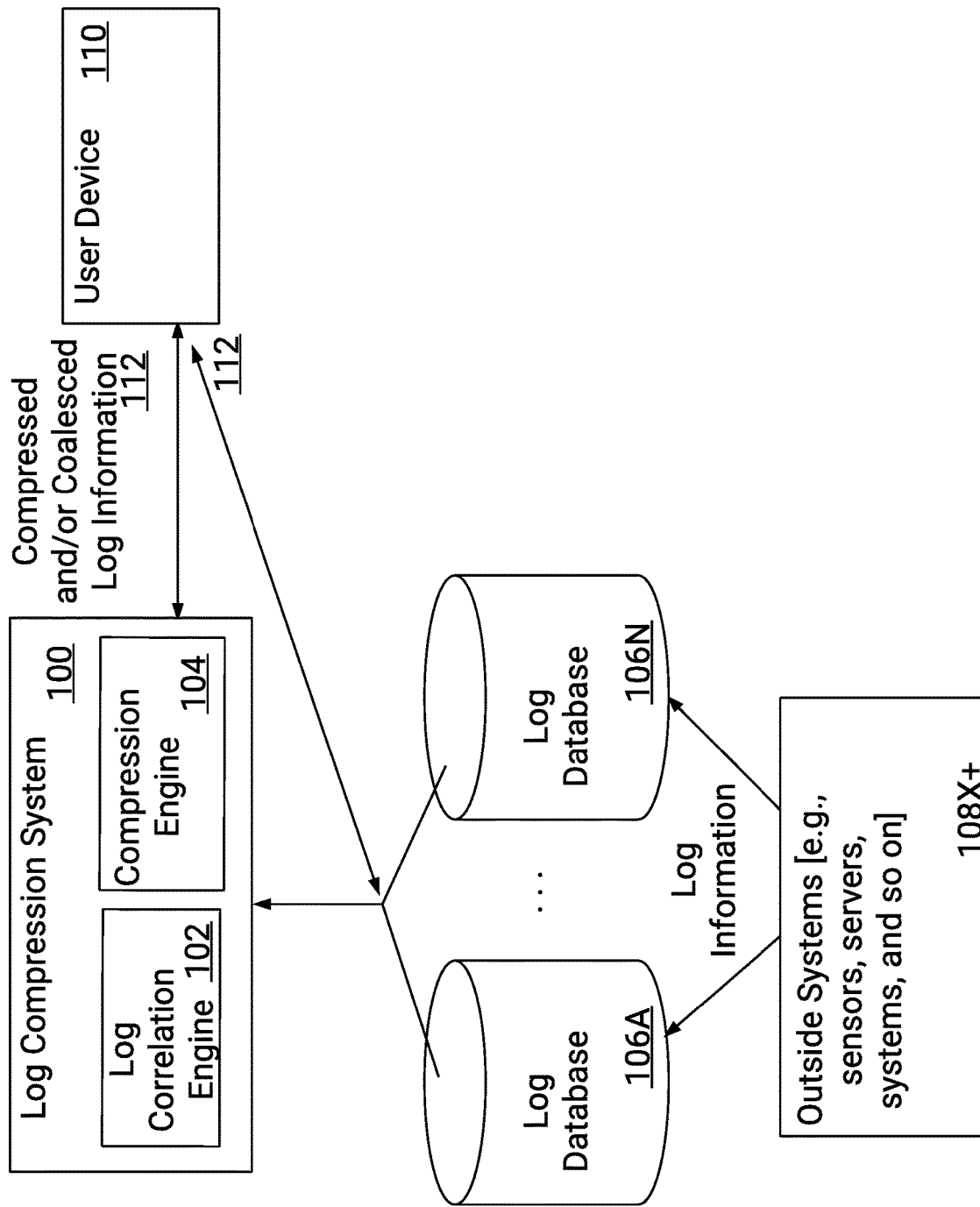
FIG. 2 illustrates a block diagram of an example log compression system.

FIG. 2 illustrates a block diagram of an example log compression system 100. The log compression system 100 can be a system of one or more computers, or one or more virtual machines executing on a system of one or more computers, and can be in communication with log databases (e.g., databases 106A-106N) storing log information obtained from outside systems 108 (e.g., sensors, server systems, probes, devices, domain controllers, and so on).

The databases 106A-106N can utilize any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases can typically be stored in one or more data stores. Accordingly, each database referred to herein (e.g., in the description herein and/or the figures of the present application) is to be understood as being stored in one or more data stores. Furthermore, the log compression system 100 can utilize distributed processing of information, such as a distributed database system, and can perform parallel processing of information to increase a speed at which compressed and/or coalesced log information is made available to downstream consumers. The distributed database system can include data stores located in different geographic areas and accessible over one or more networks. The log information can be stored in the distributed database system, and computer systems associated with the log compression system 100 can analyze the log information and generate compressed and/or coalesced information. With the increase in speed afforded by distributed systems, machine-based users can gain insights into rapidly generated logs from hundreds, thousands, and so on, of sensors or systems. In this way, the users can quickly perform actions based on monitoring the compressed and/or coalesced information.

As described above, the log information (e.g., stored, maintained, by databases 106A-106N) can include arbitrary log information obtained from outside systems, and can be organized in arbitrary formats. The databases 106A-106N can store, maintain, the log information as, for instance, database tables (e.g., as illustrated above) with respective rows of the database tables being associated with respective logs (e.g., log entries).

The log compression system 100 can access the log information, and compress and/or coalesce the log information according to one or more compression rules (e.g., as described above). For instance, the log compression system 100 includes a log correlation engine 102 that groups the log information according to unique identifiers associated with the outside systems (e.g., entities as described above), and then orders the grouped information according to time. After ordering the grouped information, a compression engine 104 determines rows indicating the unique identifier that are associated with respective sessions. Subsequently, the compression engine 104 applies one or more compression rules to compress and/or coalesce the identified rows associated with a same sensing session into a single row. The resulting compressed log information 112 can then be stored in the databases 106A-106N, and access to the compressed log information 112 can be provided to user device 110 (e.g., laptop, computer, tablet, mainframe, and so on) over a wired or wireless connection.

For example, the compressed and/or coalesced data can be provided to the user device 110 via direct access to the databases 106A-106N from the user device 110, or via the compression log system 100. Optionally, a machine-based user can access the compressed log information 112. For example, via an application programming interface (API), the machine-based user can access the compressed log information 112, and perform actions based on the access (e.g., corrective actions). As an example, the machine-based user may automatically lock down a building or a door. As another example, the machine-based user may utilize the information 112 to train a data science model. To access the compressed log information 112, the machine-based user can control or operate a device or system that is in communication with the databases 106A-106N and/or compression log system 100 via the API.

Additionally, the user device 110 can subscribe to particular types of information, such that the user device 110 can receive triggered notifications (e.g., a machine-based user can receive notifications) upon detection of particular types of information. For example, an example user device 110 can be associated with a security system. The example user device 110 can subscribe to updates related to particular types of information, such as sessions that describe unknown persons entering a room. The compression log system 100, or a system in communication with the databases 106A-106N, can monitor the compressed and/or coalesced data, and can trigger notifications to be provided to the example user device 110 based on the subscription. The user device 110 can receive the triggered notification, and optionally be automatically activated to perform corrective actions, such as locking a room, and so on.

Figure 3:
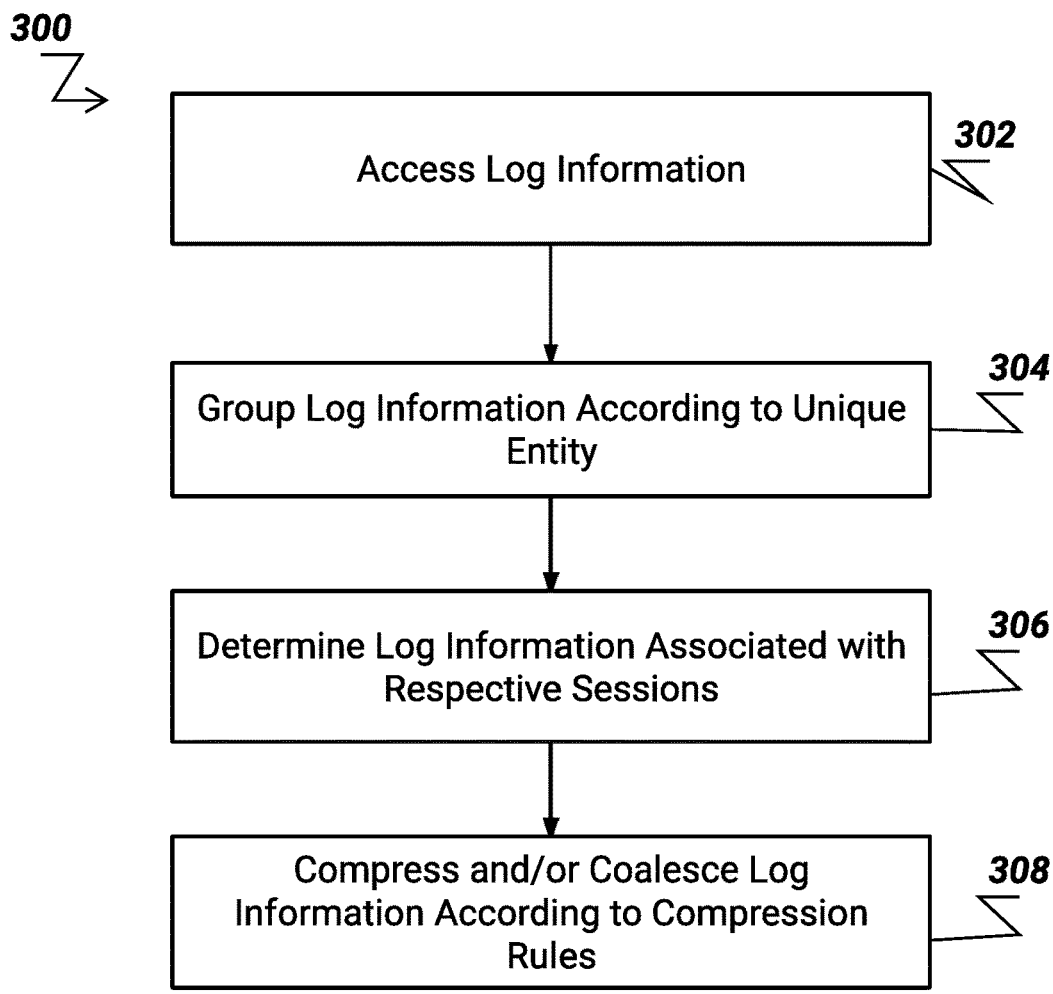
FIG. 3 illustrates an example process for generating compressed log information.

FIG. 3 illustrates an example process 300 for generating compressed log information. For convenience, the process 300 will be described as being performed by a system of one or more computers (e.g., the log compression system 100).

The system accesses log information (block 302). As described above, log information can be associated with outside systems, such as sensors, server systems, payment systems, domain controllers, probes, scientific instruments, and so on. The log information can be stored as database tables, with each row of the table specifying at least an (1) entity (e.g., user account, user, person, sensor, device, vehicle, and so on) and a (2) timestamp associated with the row. Additionally, each row can specify information associated with a session (e.g., a sensing session as described above), such as a context for which the log was generated and/or actions describing the context.

As described above, a context associated with a sensor being triggered can include the sensor detecting heat greater than a threshold. Additional example contexts can include a consumer checking out on a web page (e.g., paying for products); a user logging onto a user device, system, network; a vehicle turning onto a particular road (e.g., a count associated with vehicles on the particular road can be maintained, and the locations at which the vehicles turn off from the road can be maintained); and so on. As illustrated above, with respect to FIG. 1, the table can include one or more columns associated with a session, for instance a session identifier can specify a start of a new session, a particular column can specify a description of the session (e.g., Context, Policy, column), and another column can specify one or more actions associated with the session (e.g., vehicle entered road, vehicle turned off from road, user entered payment information, payment information processed, and so on).

The system groups log information according to entity (block 304). As described above, the log information can specify particular entities and timestamps associated with the generation of each log. The system accesses the log information, and groups logs according to specified entity, then orders the logs in each group according to timestamp. Optionally, the system can generate groups of log information that specify timestamps within a particular range (e.g., the system can discard logs older than a threshold, or a user can specify a time range the user is interested in). Similarly, the system can generate groups of log information that specify particular entities (e.g., a user can specify entities the user is interested in).

The system determines log information associated with respective sessions (block 306). As described above, the system scans the ordered grouped log information (e.g., as described in block 304), and determines adjacent logs that are associated with a same session. The system can scan the grouped log information in order of time (e.g., increasing time), and can determine a new session as initiating at a row that identifies a new, or otherwise distinct (e.g., absence of an identifier such as NULL), session identifier as compared to a prior scanned row. Additionally, a new session can be determined as initiating at a row that identifiers a different entity than a prior scanned row. Upon determining a new session initiating at a particular row, one or more subsequent rows may then be determined to be associated with the new session. With respect to a subsequent row after the particular row, the system can determine whether the session identifier is the same or has no value (e.g., NULL), and whether the entity is the same. Upon a positive determination, the system can associate the subsequent row with the new session and scan the next subsequent row.

While reference above is made to distinct sessions being based on columns specifying session identifiers and/or entities, it should be understood that other columns may be utilized and/or other descriptors of columns may be utilized. Similarly, multiple columns may be associated with a new, changed, or updated, session. For instance, and as illustrated in FIG. 1, a first column (e.g., Session ID) can indicate a distinct session, and a second column (e.g., entity) can also indicate a distinct session. Optionally, the system can first attempt to determine rows associated with distinct sessions based on a particular column (e.g., Session ID), and then attempt to determine rows associated with distinct sessions based on one or more other columns (e.g., as illustrated in FIG. 1, a context associated with "Heat Detected" for Sensor 10E does not include a Session ID, but does include a value for the column Context; in this case, the system can still identify the context and a subsequent row associated with the same context using the Context column).

Optionally, the system can determine a new session initiating at a particular row even if the system positively determines that the particular row specifies a same entity as a prior row and the particular row does not include a distinct session identifier from the prior row (e.g., as described above). For example, due to data errors, data loss, and so on, a row may fail to specify a session identifier. The system may therefore, in some embodiments, erroneously determine that multiple rows are associated with a same session as other rows. For example, due to data errors rows associated with a session describing a user paying for products may erroneously be determined to be part of an earlier session describing the user logging onto a user account. As an example, the following table includes columns specifying a session identifier (e.g., "ID"), a context of sessions (e.g., "Policy"), particular actions of sessions (e.g., "Action"), entity identifier, and timestamp.

| ID | Policy | Action | Entity Identifier | Timestamp |
| --- | --- | --- | --- | --- |
| 12345 | Login | | Identifier A | 2016 Jan. 01 12:00:00 |
| | | Authentication | Identifier A | 2016 Jan. 01 12:00:04 |
| | Checkout | | Identifier A | 2016 Jan. 01 12:00:30 |
| | | Receive Payment Information | Identifier A | 2016 Jan. 01 12:00:36 |
| | | Process Payment Information | Identifier A | 2016 Jan. 01 12:01:38 |
| | | Checkout Passed | Identifier A | 2016 Jan. 01 12:00:40 |

As illustrated above, multiple rows are included with no value for session ID after the first row. Therefore, the system may determine that all of the above rows are associated with a same session initiating at the first row specifying session ID "12345". That is, each subsequent row after the initial row specifies the same entity and does not include a distinct session identifier.

Optionally, and with respect to the above example, the system can determine that the row specifying "Checkout" at timestamp "2016-01-01 12:00:36" is associated with a new session. For example, the system can access information, and determine that a same session cannot include a "Login"

value for the Policy column and a "Checkout" value. In other embodiments a same session can include Login and Checkout values, and these values can be compressed and/or coalesced into a same row according to compression rules as described herein.

As another example, the above-recited table may not include a value of "Checkout" in the row at timestamp "2016-01-01 12:00:36". For example, the value may have been corrupted or other data loss may have occurred. In this example, the system can determine that the row at timestamp "2016-01-01 12:00:36" is associated with a new session. As an example, the system can obtain values for the Action column in subsequent rows, and determine that the values are associated with a Policy different from "Login." For instance, the system can identify a lack of a value for the Action column at timestamp "2016-01-01 12:00:36", and determine whether subsequent rows specify values for the Action column that can be associated with the "Login" policy. Optionally the system can ensure that subsequent rows also do not specify a new or distinct session ID and do not specify a different entity. Based on the detected values in the Action column, the system can determine that the context (e.g., value in the Policy column) at timestamp "2016-01-01 12:00:36" should be "Checkout." In this way, the system can guard against data corruption and/or data loss that may be inherent in particular sensors, systems, and so on.

Optionally, rows associated with a same session can be determined based, at least partly, on timestamp information. For example, the system can determine that adjacent rows specifying timestamps greater than a threshold time apart are not associated with a same session. The threshold time can be based on a context of the session (e.g., a value of a Context column as described in FIG. 1, or a value of a Policy column as described above), for example the threshold time can increase for particular contexts and decrease for other contexts, or the threshold time can be user selectable. That is, the system can determine that there may be missing logs, as it may be unlikely two logs will be associated with a same session if their timestamps are greater than the threshold time. If the timestamps are less than the threshold time, or some other threshold time, the system can determine that the associated rows are indeed associated with a same session.

The system compresses and/or coalesces log information according to compression rules (block 308). As described above, upon grouping rows according to session, the system utilizes one or more compression rules to compress the information specified in the rows into a single row. Optionally, the compression rules can depend on a context associated with grouped rows. For example, a first context can be associated with a compression rule that indicates values included in rows at a particular column are to be discarded except for a final row (e.g., according to a timestamp), while a second context can be associated with a compression rule that indicates values included in rows at the particular column are to be combined (e.g., concatenated).

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
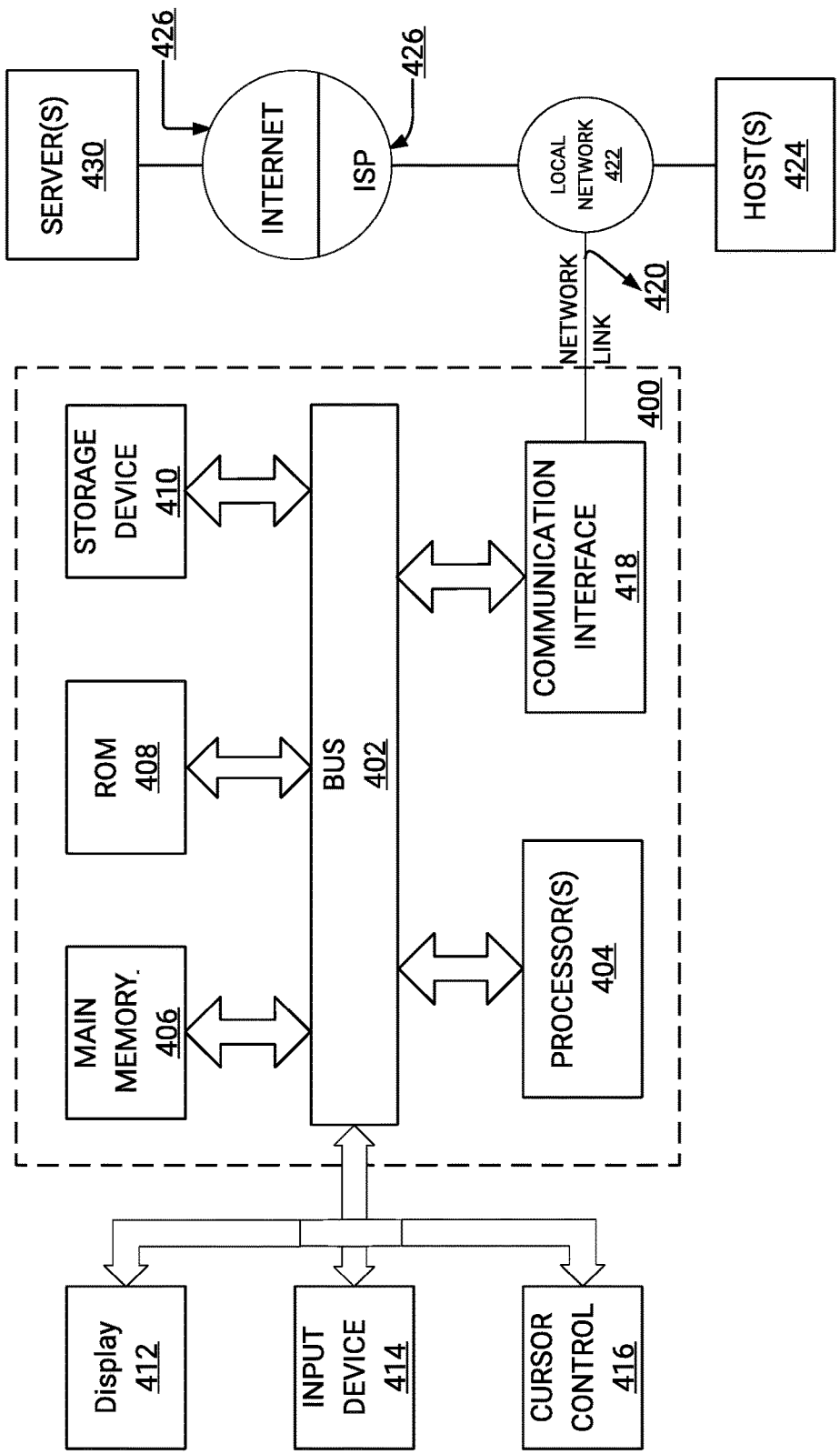
FIG. 4 is a block diagram that illustrates a computer system upon which various embodiments may be implemented.

For example, FIG. 4 is a block diagram that illustrates a computer system 400 upon which various embodiments may be implemented. The example computer system 400 can, in some embodiments, be the log compression system 100. Additionally, in some embodiments, the log compression system 100 can be a combination of multitudes of computer systems 400 networked together or otherwise in communication with each other. Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as computer executable program instructions that are executed by the computing device(s). Computer system 400 may further, as described below, implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more computer readable program instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicate with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method comprising:
by a system comprising one or more processors,
accessing log information maintained in one or more databases, the log information being generated in response to actions associated with entities, the log information including, at least, information indicative of respective sessions for which one or more logs were generated, the actions being indicative of events associated with sessions, each log including a plurality of columns and indicating an entity in a first column of the plurality of columns;
grouping log information according to entity;
determining, for respective entities based on the grouped log information, one or more logs associated with respective sessions; and
generating, from logs associated with each session, a compressed log based on one or more compression rules, wherein generating the compressed log associated with the each session comprises:
identifying a plurality of actions associated with the each session, the plurality of actions being included in a plurality of rows of a second column of the logs associated with the each session, and
concatenating the plurality of actions into a single row of the plurality of rows of the second column, wherein remaining rows of the plurality of rows of the second column are discarded.

2. The method of claim 1, wherein the log information is included in one or more database tables, and wherein the method further comprises:
updating the one or more database tables to include the compressed logs, thereby reducing a size associated with the database tables.

3. The method of claim 1, wherein each log indicates a timestamp associated with its generation, and wherein grouping log information according to entity comprises:
grouping logs according to entity; and
for each entity, sorting log information associated with the entity according to timestamp.

4. The method of claim 1, wherein a compression rule specifies a rule associated with combining, discarding, or selecting, information indicated in the logs associated a session.

5. The method of claim 1, wherein the log information is included in one or more database tables, and wherein at least two logs associated with a particular session are separated in the database tables by hundreds or thousands of logs.

6. The method of claim 1, further comprising:
receiving, via application programing interface (API) calls, requests for compressed logs, the requests being received over one or more networks by an outside system associated with the entities; and providing, to the outside system, the compressed logs, such that the outside system can perform corrective actions in response to analyzing the compressed logs.

7. The method of claim 1, further comprising:
accessing information indicating subscriptions to types of information by user devices;
identifying, based on the compressed logs, a particular compressed log that includes a type of information to which a particular user device subscribes; and
generating notification information for providing to the user device, the notification information automatically activating the particular user device to perform one or more corrective actions.

8. A system comprising one or more computers and computer storage media storing instructions that when executed by the one or more computers, cause the one or more computers to perform operations comprising:
accessing log information maintained in one or more databases, the log information being generated in response to actions associated with entities, the log information including, at least, information indicative of respective sessions for which one or more logs were generated the actions being indicative of events associated with sessions, each log including a plurality of columns and indicating an entity in a first column of the plurality of columns;
grouping log information according to entity;
determining, for respective entities based on the grouped log information, one or more logs associated with respective sessions; and
generating, from logs associated with each session, a compressed log based on one or more compression rules, wherein generating the compressed log associated with the each session comprises:
identifying a plurality of actions associated with the each session, the plurality of actions being included in a plurality of rows of a second column of the logs associated with the each session, and
concatenating the plurality of actions into a single row of the plurality of rows of the second column, wherein remaining rows of the plurality of rows of the second column are discarded.

9. The system of claim 8, wherein the log information is included in one or more database tables, and wherein the operations further comprise:
updating the one or more database tables to include the compressed logs, thereby reducing a size associated with the database tables.

10. The system of claim 8, wherein each log indicates a timestamp associated with its generation, and wherein grouping log information according to entity comprises:
grouping logs according to entity; and
for each entity, sorting log information associated with the entity according to timestamp.

11. The system of claim 8, wherein a compression rule specifies a rule associated with combining, discarding, or selecting, information indicated in the logs associated a session.

12. The system of claim 8, wherein the log information is included in one or more database tables, and wherein at least two logs associated with a particular session are separated in the database tables by hundreds or thousands of logs.

13. The system of claim 8, wherein the operations further comprise:
receiving, via application programing interface (API) calls, requests for compressed logs, the requests being received over one or more networks by an outside system associated with the entities; and
providing, to the outside system, the compressed logs, such that the outside system can perform corrective actions in response to analyzing the compressed logs.

14. The system of claim 8, wherein the operations further comprise:
accessing information indicating subscriptions to types of information by user devices;
identifying, based on the compressed logs, a particular compressed log that includes a type of information to which a particular user device subscribes; and
generating notification information for providing to the user device, the notification information automatically activating the particular user device to perform one or more corrective actions.

15. Non-transitory computer storage media storing instructions that when executed by a system of one or more computers cause the system to perform operations comprising:
accessing log information maintained in one or more databases, the log information being generated in response to actions associated with entities, the log information including, at least, information indicative of respective sessions for which one or more logs were generated, the actions being indicative of events associated with sessions, each log including a plurality of columns and indicating an entity in a first column of the plurality of columns;
grouping log information according to entity;
determining, for respective entities based on the grouped log information, one or more logs associated with respective sessions; and
generating, from logs associated with each session, a compressed log based on one or more compression rules, wherein generating the compressed log associated with the each session comprises:
identifying a plurality of actions associated with the each session, the plurality of actions being included in a plurality of rows of a second column of the logs associated with the each session, and
concatenating the plurality of actions into a single row of the plurality of rows of the second column, wherein remaining rows of the plurality of rows of the second column are discarded.

16. The computer-storage media of claim 15, wherein the log information is included in one or more database tables, and wherein the operations further comprise:
updating the one or more database tables to include the compressed logs, thereby reducing a size associated with the database tables.

17. The computer-storage media of claim 15, wherein each log indicates a timestamp associated with its generation, and wherein grouping log information according to entity comprises:
grouping logs according to entity; and
for each entity, sorting log information associated with the entity according to timestamp.

18. The computer-storage media of claim 15, wherein a compression rule specifies a rule associated with combining, discarding, or selecting, information indicated in the logs associated a session.

19. The computer-storage media of claim 15, wherein the operations further comprise:
receiving, via application programing interface (API) calls, requests for compressed logs, the requests being received over one or more networks by an outside system associated with the entities; and providing, to the outside system, the compressed logs, such that the outside system can perform corrective actions in response to analyzing the compressed logs.

20. The computer-storage media of claim 15, wherein the operations further comprise:

accessing information indicating subscriptions to types of information by user devices;

identifying, based on the compressed logs, a particular compressed log that includes a type of information to which a particular user device subscribes; and generating notification information for providing to the user device, the notification information automatically activating the particular user device to perform one or more corrective actions.

* * * * *